US006399214B1

(12) United States Patent
Schou

(10) Patent No.: US 6,399,214 B1
(45) Date of Patent: Jun. 4, 2002

(54) METHOD FOR PRODUCTION OF CORES FOR DOORS, PARTITIONS, FURNITURE AND SUCH CORES

(75) Inventor: Lars Schou, Fano (DK)

(73) Assignee: Agro Biomass Consult APS, Esbjerg (DK)

( * ) Notice: Subject to any disclaimer, the term of this patent is extended or adjusted under 35 U.S.C. 154(b) by 0 days.

(21) Appl. No.: 09/319,312

(22) PCT Filed: Dec. 5, 1997

(86) PCT No.: PCT/DK97/00553

§ 371 (c)(1), (2), (4) Date: Jul. 21, 1999

(87) PCT Pub. No.: WO98/25002

PCT Pub. Date: Jun. 11, 1998

(30) Foreign Application Priority Data

Dec. 6, 1996 (DK) .......................................... 9600438 U

(51) Int. Cl.[7] .................................................. B32B 5/00

(52) U.S. Cl. ................. 428/537.1; 428/528; 428/318.4; 264/45.3; 264/109; 52/DIG. 9

(58) Field of Search .......................... 52/309.1, DIG. 9; 428/537.1, 528, 318.4, 304.4; 156/62.2; 264/124, 109, 45.3

(56) References Cited

U.S. PATENT DOCUMENTS 3,619,450 A * 11/1971 Futo ........................... 264/109
3,919,017 A * 11/1975 Showmker et al. ........ 156/62.2
4,154,030 A * 5/1979 Huguet .......................... 52/98
4,347,345 A * 8/1982 Blount ....................... 527/301
4,761,342 A * 8/1988 Bjorhaag et al. ........ 428/537.1
5,017,319 A * 5/1991 Shen .......................... 264/124
5,183,837 A * 2/1993 Lepori et al. ................. 524/13
5,194,461 A * 3/1993 Bergquist et al. ............. 524/13
5,217,776 A * 6/1993 Tilby ........................... 428/61
5,284,546 A * 2/1994 Tilby ....................... 156/583.5
5,436,069 A * 7/1995 Winterowd et al. ...... 428/308.8
5,498,469 A * 3/1996 Howard et al. ............. 428/218
5,507,988 A * 4/1996 Eagan et al. ............... 264/122
5,684,114 A * 11/1997 Phillips et al. .............. 528/129
5,716,563 A * 2/1998 Winterowd et al. ........ 264/45.5
5,824,246 A * 10/1998 Reetz ......................... 264/122
5,891,937 A * 4/1999 Berg et al. ..................... 524/13
5,902,442 A * 5/1999 Phillips et al. .............. 156/296
6,083,623 A * 4/2000 Stofko ........................ 428/403

FOREIGN PATENT DOCUMENTS

GB 2201175 * 8/1988

* cited by examiner

*Primary Examiner*—Robert Canfield
(74) *Attorney, Agent, or Firm*—Ladas & Parry

(57) ABSTRACT

A method for production of cores for doors, partitions, furniture and the like. A filling material is mixed with a binding agent and the core is form-pressed in a desired shape, preferably as a plate-shaped item, where biomass is used as filling material, for instance, in the form of straw and stalks. A binding agent is used, mainly consisting of either UF-glue (urea-formaldehyde) or MUF-glue (melamin urea-formaldehyde). Preferably, the core further contains a foaming agent. A core may be provided as a form-pressed, mainly plate-shaped item, where the filling material consists of biomass, for instance, in the form of disintegrated straw and stalks, and where the binding agent mainly consists of UF-glue or MUF-glue, to which a foaming agent preferably is added.

12 Claims, 2 Drawing Sheets

METHOD FOR PRODUCTION OF CORES FOR DOORS, PARTITIONS, FURNITURE AND SUCH CORES

BACKGROUND OF THE INVENTION

1 Field of the Invention

The present invention relates to a method for production of cores used for doors, partitions, furniture and the like and of the resulting products as described herein.

2 Background Art

Known cores for doors, partitions, furniture and the like consist mostly of cardboard, chip board or wood. It is common to use cores made from cardboard in very easy and cheap constructions, for instance, in door plates. If more strength is needed, chip board provides a reasonable alternative, but involves a more expensive and more heavy construction, for instance, for use in plates for doors and furniture.

SUMMARY OF THE INVENTION

The invention provides a method for production of cores of the type described herein, making it possible to produce improved cores. The manufacturing process is easy to optimize and easy to integrate in relation to the form in the finished item, for instance, to provide profiled plates for doors or furniture. The invention also extends to the resulting products of the method, and includes profiled doors and furniture.

The method according to the invention is distinctive in that biomass is used as filling material, for instance in the form of straw and stalks. A binding agent is used, mainly consisting of either UF-glue (urea-formaldehyde) or MUF-glue (melamin urea-formaldehyde), as shown in step 1 of FIG. 2. Preferably, the filling material contains a foaming agent. By means of simple provisions, it hereby becomes possible to produce improved cores of the type described herein, which are easy to optimize to the actual use, and which are easy to integrate in relation to the form in the inventive finished item, for instance, in profiled plates for doors or furniture. Appropriately, the apparatus according to the invention may be so modified that the core is form-pressed into a plate-shape, as shown in step 2 (FIG. 2), and that the core afterwards is milled in shape for use in profiled doors and furniture plates.

Appropriately, the apparatus according to the invention may be so modified that the core is form-pressed into a plate-shape, and that the core afterwards is milled in shape for use in profiled doors and furniture plates.

Alternatively, the method according to the invention may be so modified that the core is form-pressed between prefabricated shells with the desired shape corresponding to the profiling of the finished door plate or furniture plate. For special situations, prefabricated shells with asymmetric profiling may advantageously be used—for instance, in such a manner that the door plate or furniture plate may include a plane inner side and a profiled outer side.

The invention furthermore relates to a core produced in accordance with the method according to the invention. In a preferred embodiment, a form-pressed, mainly plate-shaped item is shown, which core is distinctive in that the filling material consists of biomass, for instance, in the form of disintegrated straw and stalks, that the binding agent mainly consists of UF-glue or MUF-glue, to which a foaming agent is added.

Appropriately the core according to the invention is provided as a form-pressed plate, which after hardening, step 3 (FIG. 2), is milled in shape for use in profiled doors and furniture plates.

Preferably the core according to the invention is furthermore provided as a laminate as the core is form-pressed between pre-fabricated shells with shape corresponding to the desired profiling of the finished door plate or furniture plate.

Most advantageously the core according to the invention may be filling material that is partly disintegrated, preferably in bundles of fiber in a manner such that the core provides a uniform pore structure (density profile).

DETAILED DESCRIPTION OF THE PREFERRED EMBODIMENTS

Figure 1:
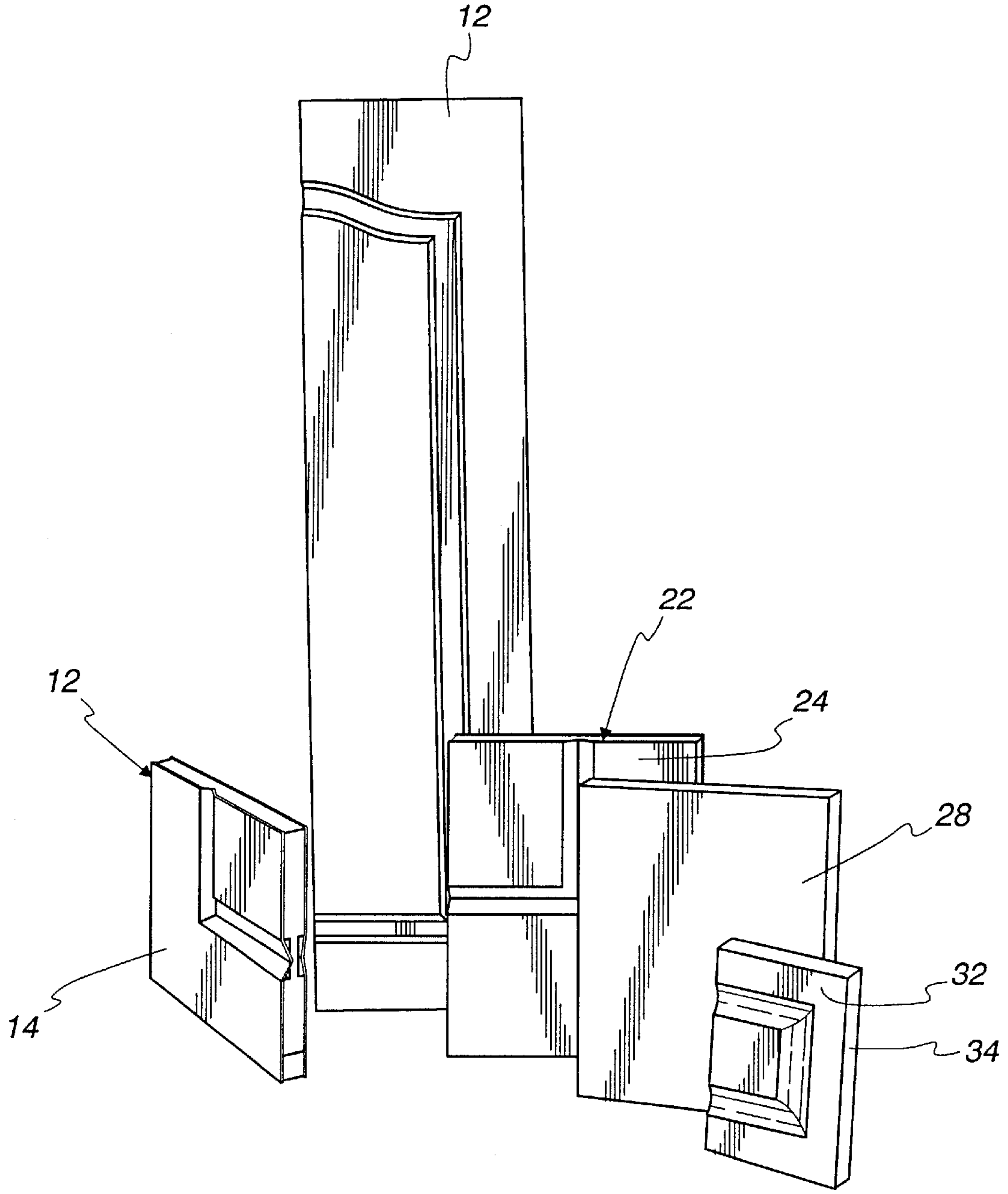
FIG. 1 illustrates in a perspective view several embodiments of the finished product which have been fabricated utilizing the inventive method of manufacture.
Figure 2:
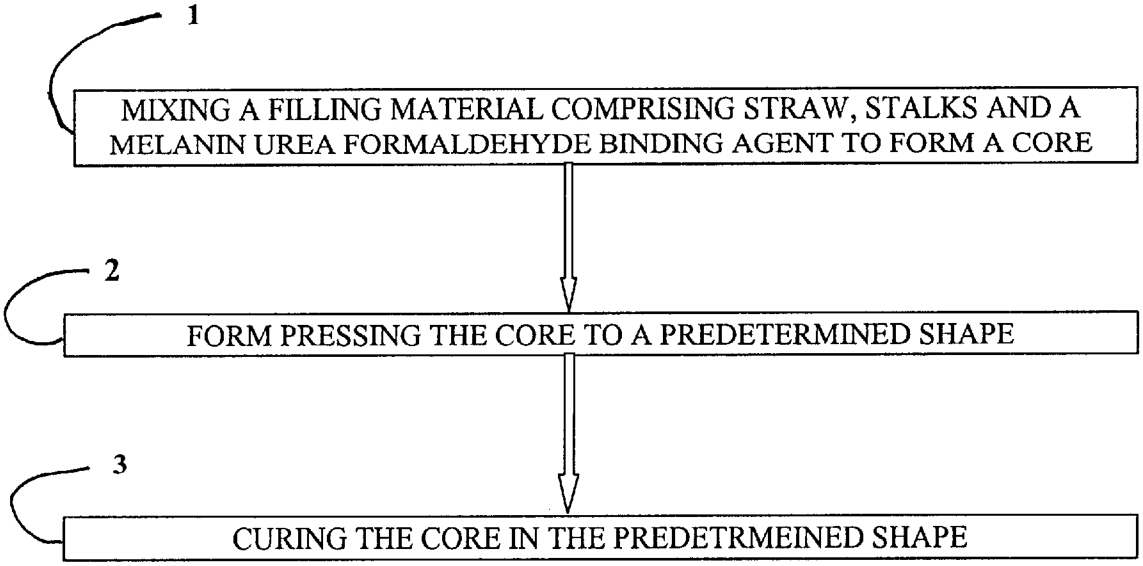
FIG. 2 is a block flowchart diagram showing the steps of the inventive method.

In one embodiment, shown at the rear, a profiled door pate 10, full length product, painted white, is shown having been sectioned along its length. A second embodiment is shown at the left, and comprises a corner part 14 of a two-sided profiled door plate 12. At the right, a lower side view of a corner part 24 of a profiled door plate 22, painted white is shown. In yet another embodiment, a plane building plate 28 is shown. At the furthest right, a core 34 for a profiled door 32, for instance for a kitchen cupboard, is shown.

The method according to the invention to manufacture plates 10, 12, 22, 28 and 34 may be so modified that the core is form-pressed between pre-fabricated shells with the desired shape corresponding to the profiling of the finished door plate or furniture plate. For special situations, prefabricated shells with asymmetric profiling may advantageously be used—for instance, in such a manner that the door plate or furniture plate may include a plane inner side and a profiled outer side.

It should be emphasized that the method according to the present invention primarily is intended for use in the production of cores for plates used in doors or furniture. Of course, it may be within the scope of the invention to use the method more generally, for instance in construction, such as cores used in other items, for example, in partitions, floors and table tops.

Other alterations and modifications may be made without departing significantly from the scope of the invention. For instance, door plates and building plates produced in accordance with the invention may be modified by adding fire restrictive additives, for instance vermiculite, so as to fulfill the existing specifications for fire doors (BD30 and BD60).

What is claimed is:

1. Cores for doors, partitions, and furniture, which are form pressed in a desired shape as plate-shaped items, comprising a filling material bound with a binding agent, wherein the filling material is further comprised of straw and stalks and the binding agent is further comprised of urea formaldehyde and a foaming agent.

2. Cores according to claim 1, wherein the cores further comprise form pressed plates, which after hardening, are milled in shape for use in profiled doors and furniture plates.

3. Cores according to claim 1 further comprising laminates that have been form pressed between pre-fabricated shells having a shape corresponding to the predetermined shape for profiling of the finished door plate or furniture plate.

4. Cores according to claim 1, wherein the filling material is partly disintegrated and wherein bundles of fiber are arranged so that the cores have a uniform pore structure.

5. Cores according to claim 1, wherein the filling material further comprises a fire restrictive additive.

6. Cores according to claim 5, wherein said fire restrictive additive further comprises vermiculite.

7. A method for producing cores for doors, partitions, and furniture comprising the following steps:

mixing a filling material comprised of straw and stalks with a binding agent comprised of melamin urea formaldehyde and a foaming agent to form the core;

form pressing the core to a predetermined shape; and curing the core in the predetermined shape.

8. A method according to claim 7, wherein the steps of form pressing the core pressed in further comprises form pressing the core into a plate-shape, and then milling the core into a shape for use in profiled doors and furniture plates.

9. A method according to claim 8, further comprising form pressing prefabricated shells for use with the cores, said shells having asymmetric profiling including a plane innerside and a profiled outer side.

10. A method according to claim 7 further comprising form pressing the core between prefabricated shells having the predetermined shape corresponding to profiling of the predetermined shape of a finished door plate or furniture plate.

11. A method according to claim 7, wherein said mixing step further comprises mixing a fire restrictive additive in with said filling material.

12. A method according to claim 7, wherein said mixing step further comprises mixing vermiculite with said filling material.

* * * * *